US009610998B1

(12) United States Patent
LaBonty (10) Patent No.: US 9,610,998 B1
(45) Date of Patent: Apr. 4, 2017

(54) SCOOTER AND STEERING SYSTEM (71) Applicant: Phillip LaBonty, Newport Beach, CA (US)

(72) Inventor: Phillip LaBonty, Newport Beach, CA (US)

( * ) Notice: Subject to any disclaimer, the term of this patent is extended or adjusted under 35 U.S.C. 154(b) by 0 days.

(21) Appl. No.: 15/193,597

(22) Filed: Jun. 27, 2016

Related U.S. Application Data (60) Provisional application No. 62/271,853, filed on Dec. 28, 2015.

(51) Int. Cl.
*B62K 5/08* (2006.01)
*B62K 21/14* (2006.01)
*B62K 5/00* (2013.01)

(52) U.S. Cl.
CPC .............. *B62K 5/08* (2013.01); *B62K 21/145* (2013.01); *B62K 2005/001* (2013.01)

(58) Field of Classification Search
CPC ........................................................ B62K 5/08
See application file for complete search history.

(56) References Cited

U.S. PATENT DOCUMENTS

2002/0063405 A1\* 5/2002 Nardone ................ B62K 3/002
280/87.041

\* cited by examiner

*Primary Examiner* — John Walters
*Assistant Examiner* — James Triggs
(74) *Attorney, Agent, or Firm* — Eric Karich; Karich & Associates (57) ABSTRACT A scooter has a front support frame that is pivotally connected to a scooter deck. A pair of front wheels are each operably mounted the front support frame via wheel pivots. At least one spring is operably mounted between the front support frame and the scooter deck for biasing the scooter deck towards a horizontal configuration, but enabling the scooter deck to move to a leaning configuration when turning. A steering transmission arm transmits lateral movement via a pair of steering rods to the front wheels, so that when the scooter deck is leaned to one of the leaning configurations, the movement causes the steering transmission arm to turn the front wheels via the steering rods.

14 Claims, 6 Drawing Sheets

SCOOTER AND STEERING SYSTEM

CROSS-REFERENCE TO RELATED APPLICATIONS

This application for a utility patent claims the benefit of U.S. Provisional Application No. 62/271,853, filed Dec. 28, 2015.

BACKGROUND OF THE INVENTION

Field of the Invention

This invention relates generally to scooters, and more particularly to a three-wheeled scooter having a unique steering system.

Description of Related Art

Prior art scooters typically have two wheels, a front wheel and a rear wheel, and the scooter is steered by rotating handlebars to twist the front wheel about the axis of the steering column. While this construction is simple and inexpensive, it is also fairly unstable, and can be difficult to ride. The single front wheel may tend to get stuck or jarred to different directions by irregularities in the riding surface, and the steering may lead to abrupt changes in direction that may throw a rider.

The present invention provides a pair of front wheels that are more capable of traversing irregularities in the terrain, or dealing with obstructions, debris, etc. Furthermore, the lean-to-steer steering mechanism makes steering easy, intuitive, and less likely to lead to the user falling during use.

SUMMARY OF THE INVENTION

The present invention teaches certain benefits in construction and use which give rise to the objectives described below.

The present invention provides a scooter that includes a front support frame that is pivotally connected to a scooter deck. The front support frame has a center body that extends lateral to ends. A pair of wheel pivots are each mounted on one of the ends of the front support frame. A pair of front wheels are each operably mounted on one of the wheel pivots of the front support frame. The scooter deck has a front and a back end, the front end being pivotally mounted to the front support frame so that the scooter deck can pivot about an axis between a horizontal configuration and leaning configurations. A handlebar structure is mounted on a steering post that extends upwardly from the front end of the scooter deck. At least one spring is operably mounted between the front support frame and the scooter deck for biasing the scooter deck towards the horizontal configuration, but enabling the scooter deck to move to one of the leaning configurations when turning. A steering transmission arm has a proximal end, a middle portion, and a distal end; a first pivot is pivotally attaching the proximal end of the steering transmission arm to the front support frame; and a second pivot is pivotally attaching the middle portion of the steering transmission arm to the scooter deck. A pair of steering rods each have an inner end and an outer end, the inner ends being pivotally connected to the distal end of the steering transmission arm, the outer ends being operably connected to one of the front wheels, so that when the scooter deck is leaned to one of the leaning configurations, the movement causes the steering transmission arm to move about the second pivot, thereby turning the front wheels via the steering rods. The scooter further includes a rear wheel operably mounted to the back end of the scooter deck.

A primary objective of the present invention is to provide a scooter having advantages not taught by the prior art.

Another objective is to provide a scooter that includes a lean-to-steer steering system that is easy to operate and fun to ride.

Another objective is to provide a scooter that is stable even over irregular terrain.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, a scooter 10 with a unique lean-to-steer steering system that provides superior performance to prior art scooters.

Figure 1:
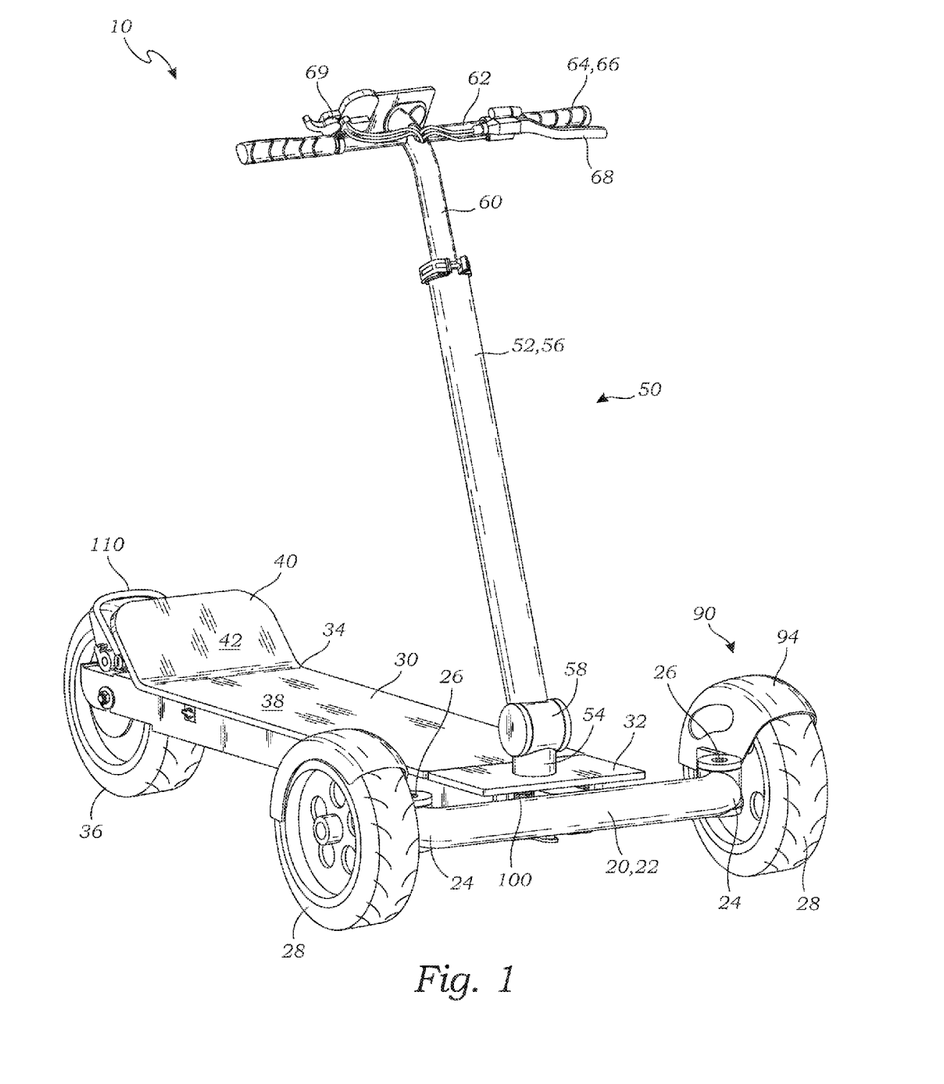
FIG. 1 is a perspective view of a scooter according to one embodiment of the present invention, illustrating the scooter in a horizontal configuration.

FIG. 1 is a perspective view of the scooter 10 according to one embodiment of the present invention. As shown in FIG. 1, the scooter 10 includes a front support frame 20 having a center body 22 that extends lateral to ends 24. In this embodiment, the front support frame 20 is a tubular construction, in this case having a round cross-section, although other cross-sectional shapes may also be used. The front support frame 20 may be in the form of any suitable structural member or members, and may be constructed of a suitably rigid and strong material (e.g., steel, aluminum, suitable plastic, or any other material known in the art suitable for this type of structural component).

As shown in FIG. 1, a pair of wheel pivots 26 are also provided, each mounted on one of the ends 24 of the front support frame 20. The wheel pivots 26 are used to pivotally mount a pair of front wheels 28, with each of the front wheels 28 being operably mounted on one of the wheel pivots 26 of the front support frame 20. The wheel pivots 26 may include a pin (as illustrated), or any other form of hinge, joint, articulation, swivel, or pivotal connector known in the art that enable the front wheels 28 to turn as described below.

As shown in FIG. 1, the scooter 10 further includes a scooter deck 30 pivotally mounted on the front support frame 20. The scooter deck 30 includes a front end 32 and a back end 34, the front end 32 being pivotally mounted to the front support frame 20 so that the scooter deck 30 can pivot about an axis A between a horizontal configuration and leaning configurations, and the back end 34 being operably attached to a rear wheel 36. The scooter deck 30 is a generally elongate structure that provides a top surface 38 that is suitably shaped for a rider to stand on the scooter deck 30 and thus ride the scooter 10. The scooter 10 deck may be generally planar in construction, but may further include suitable contours, surface texturing (especially anti-slip texturing or shaping). In this embodiment, a rear portion 40 of the scooter deck 30 is canted upwardly to provide a sloped rear surface 42 that extends partially over the rear wheel 36.

As shown in FIG. 1, the scooter 10 further includes a handlebar structure 50 mounted on a steering post 52 that extends upwardly from the front end 32 of the scooter deck 30. In the embodiment of FIG. 1, the steering post 52 includes a base 54 and an upper portion 56 connected by a pivot 58 that enables the steering post 52 to be folded against the scooter deck 30 for transportation and storage. The base 54 is fixedly attached to the scooter deck 30, so that the handlebar structure 50 does not twist in a manner similar to most scooters for steering the scooter 10. Instead, as discussed in more detail below, the handlebar structure 50 is simply grasped by the user for balance, and it is in leaning the scooter 10 itself that the scooter 10 is steered.

The handlebar structure 50 may include, at a top end 60, laterally extending arms 62 that extend to ends 64 that include grips 66, as is known in the art. The handlebar structure 50 may further include a brake lever 68, a throttle 69, and other forms of controls known in the art. In the present embodiment, the scooter 10 includes a motor (not shown) so that the scooter 10 is powered, but in alternative embodiments the scooter 10 may be manually powered by the user. Since these aspects of the invention are well known in the art, they are not described in greater detail herein.

FIG. 1 illustrates the scooter 10 in a horizontal configuration, wherein the scooter deck 30 is generally horizontal (and not being leaned to a side by the user). As discussed in more detail below, when the scooter 10 is in the horizontal configuration, it moves straight forward.

Figure 2:
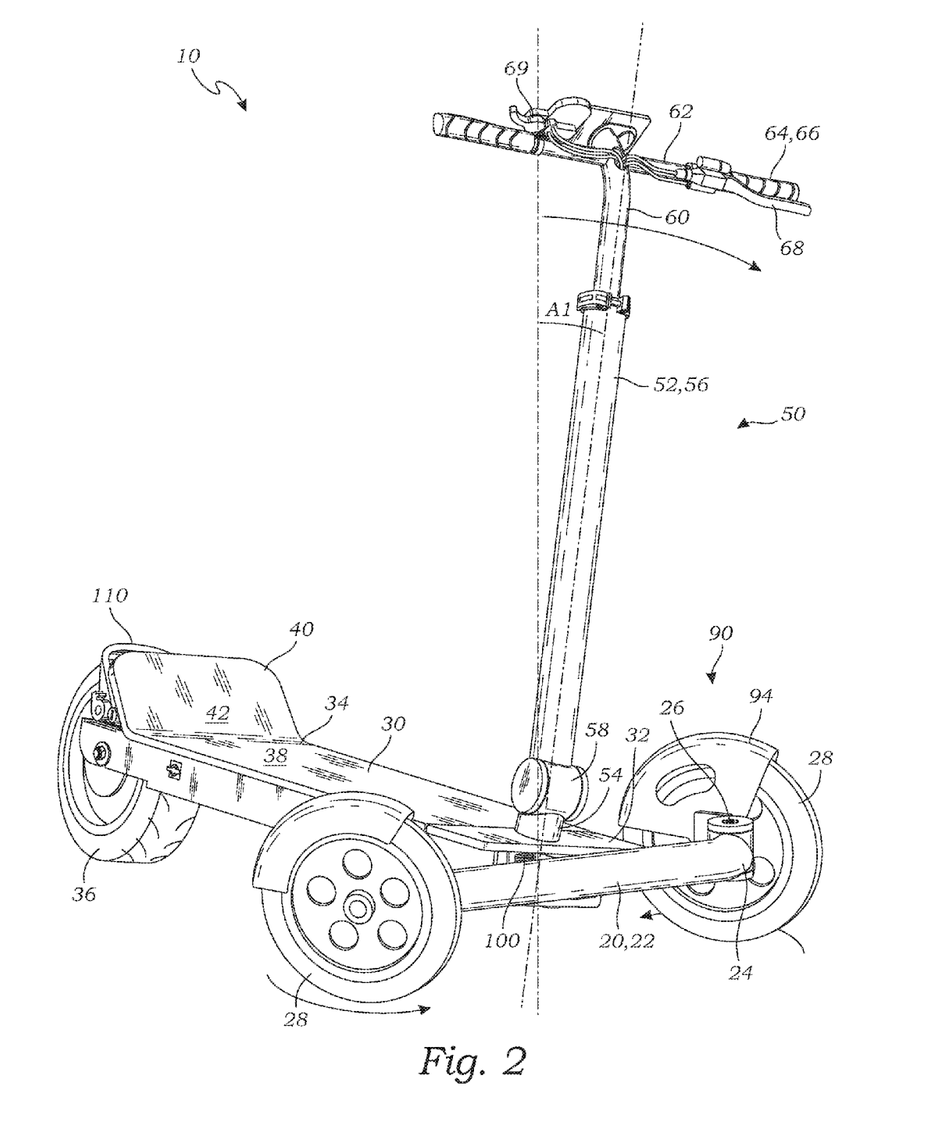
FIG. 2 is a perspective view of the scooter in a leaning configuration, illustrating how leaning the scooter to a side causes the front wheels to turn.

FIG. 2 is a perspective view of the scooter 10 in the leaning configuration. As shown in FIG. 2, when the scooter 10 is leaned to the side, the front wheels 28 turn into the direction in which the scooter 10 is leaning. In the embodiment of FIG. 2, the scooter 10 is illustrated in the leaning configuration so that the steering post 52 of the handlebar structure 50 is positioned at an angle A1 from the vertical steering post 52 (i.e., the orientation of the steering post 52 when in the horizontal configuration, although not necessarily strictly orthogonal to a horizontal surface upon which the scooter 10 may be resting).

Figure 3:
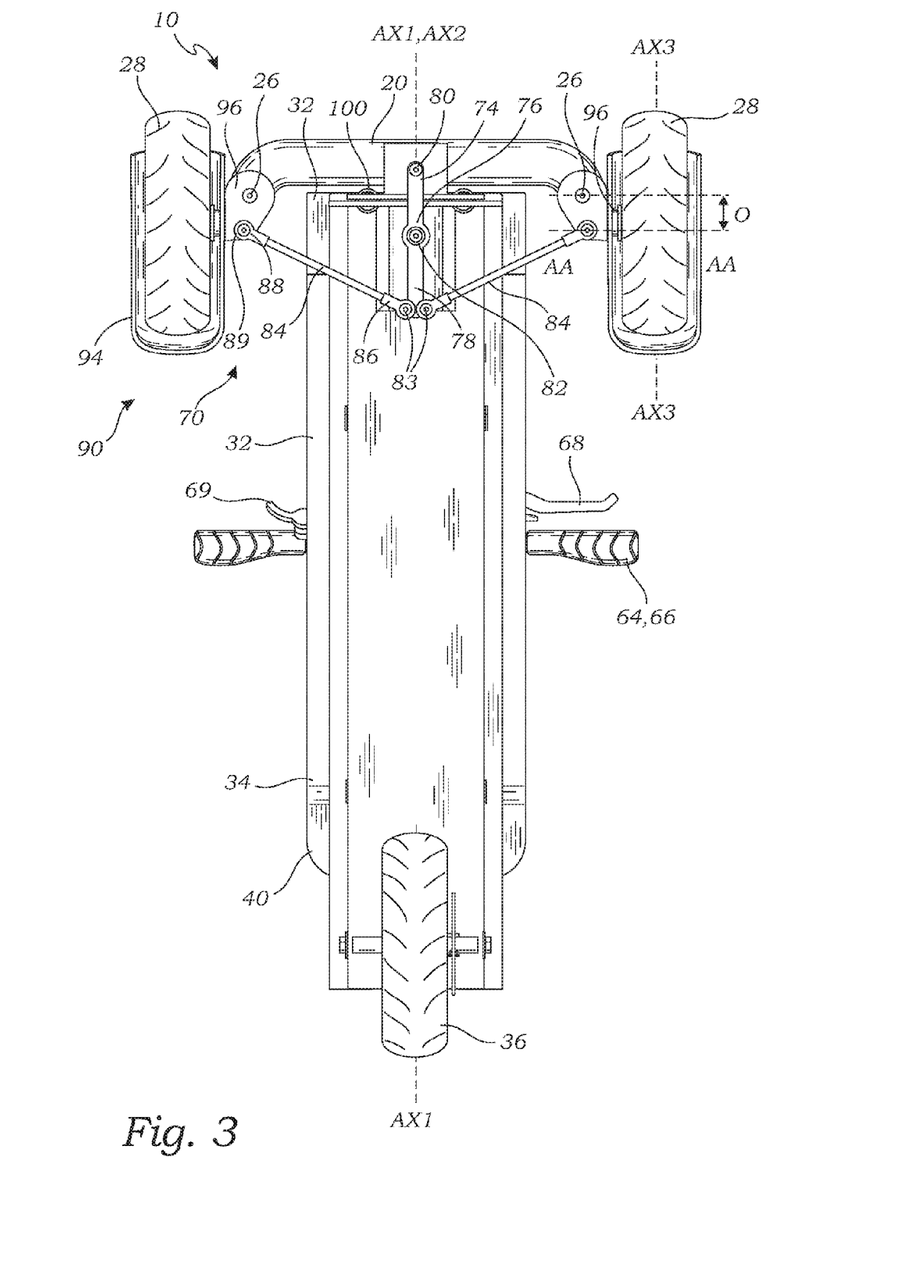
FIG. 3 is a bottom plan view of the scooter of FIG. 1, illustrating a steering system of the scooter when the scooter is in the horizontal configuration.
Figure 4:
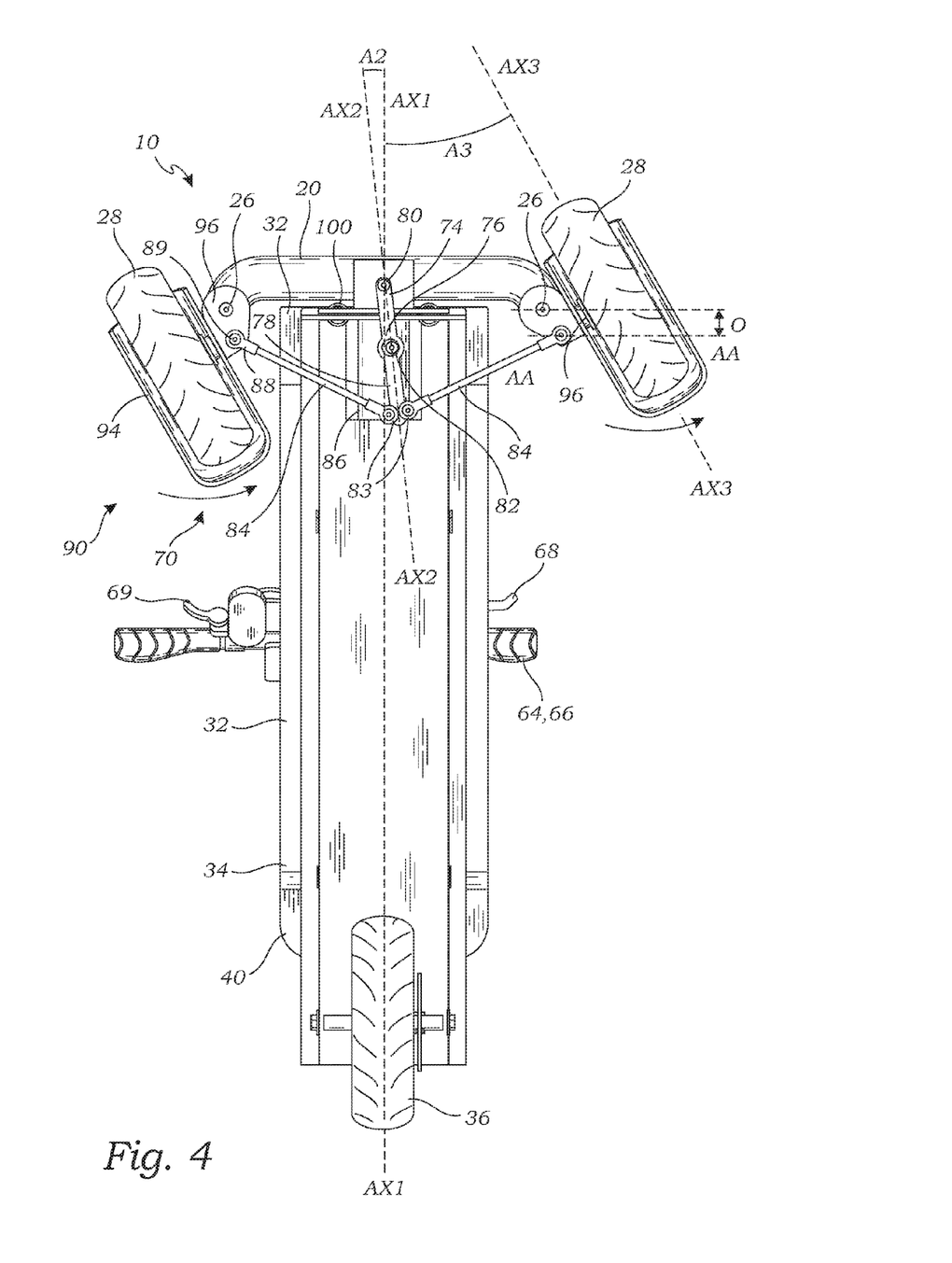
FIG. 4 is a bottom plan view of the scooter of FIG. 2, illustrating the steering system when the scooter is in the leaning configuration.

FIG. 3 is a bottom plan view of the scooter 10 of FIG. 1, illustrating a steering system 70 of the scooter 10 when the scooter 10 is in the horizontal configuration. FIG. 4 is a bottom plan view of the scooter 10 of FIG. 2, illustrating the steering system 70 when the scooter 10 is in the leaning configuration. As shown in FIGS. 3 and 4, the steering system 70 includes a steering transmission arm 72, first and second pivots 80 and 82, and a pair of steering rods 84 for operably controlling the orientation of the front wheels 28 in response to how the scooter 10 is leaning.

As shown in FIGS. 3 and 4, the steering transmission arm has a proximal end 74, a middle portion 76, and a distal end 78. A first pivot 80 pivotally attaches the proximal end 74 of the steering transmission arm 72 to the front support frame 20. A second pivot 82 pivotally attaches the middle portion 76 of the steering transmission arm 72 to the scooter deck 30 (i.e., a portion of the scooter deck 30, or a component thereof that is fixedly attached to the scooter deck 30). The first and second pivots 80 and 82 cause the steering transmission arm 72 to move in response to the twisting of the scooter deck 30 relative to the front support frame 20, so that the distal end 78 of the steering transmission arm 72 moves back and forth in response to said twisting (i.e., leaning of the scooter deck 30).

The pair of steering rods 84 are attached to the distal end 78 of the steering transmission arm 72, so that they move in concert therewith. Each of the pair of steering rods 84 has an inner end 86 and an outer end 88, the inner end 86 of each of the steering rods 84 being pivotally connected to the distal end 78 of the steering transmission arm 72 with a third pivot 83, the outer end 88 of each of the steering rods 84 being operably connected to one of the front wheels 28 (e.g., a fourth pivot 89), so that when the scooter deck 30 is leaned to one of the leaning configurations, the movement causes the steering transmission arm 72 to move about the second pivot 82, thereby turning the front wheels 28 via the steering rods 84. For purposes of this application, the term "steering rod" is defined to include any form of rigid connecting structure that functions to transmit the movement of the distal end 78 of the steering transmission arm 72 to the front wheels 28, and does not have to have the particular shape illustrated in the present embodiment.

FIG. 3 illustrates the steering system 70 in a resting, horizontal configuration, and in this embodiment the steering transmission arm 72 has an axis AX2 that is aligned with the axis AX1 of the scooter deck 30. The front wheels 28 are disposed on an axis AX3 that is parallel to the axis AX1 of the scooter deck 30 (the axis AX3 of the front wheels 28 being defined to be the direction of rectilinear movement of the front wheels 28).

As is illustrated in FIG. 4, when the steering system 70 in the leaning configuration, the axis AX2 of the steering transmission arm 72 is at an angle A2 to the axis AX1 of the scooter deck 30. The front wheels 28 are turned so that the axis AX3 is at an angle A3 to the axis AX1 of the scooter deck 30. The angles A2 and A3 may be the same, or they may be different.

In the embodiment of FIGS. 3 and 4, each of the front wheels 28 includes a wheel housing 90 that is attached to the front support frame 20 with one of the wheel pivots 26. In this embodiment, the wheel housing 90 includes an axle 92 for rotatably mounting the front wheel 28, a fender 94 for covering a portion of the front wheel 28, and a pivot mounting body 96 that extends laterally from the axle 92. The wheel pivot 26 may extend through the pivot mounting body 96. The wheel pivot 26 may be positioned forward of the axle 92 a distance D. In this embodiment, the pivot mounting body 96 has a cam-shape.

In the embodiment of FIGS. 3 and 4, the outer end 88 of the steering rod 84 may be attached to the pivot mounting body 96 behind the wheel pivot 26. The outer end 88 of the steering rod 84 may be attached to the pivot mounting body 96 at the fourth pivot 89 that is laterally across from or behind the axle 92 of the front wheel 28.

The scooter 10 also includes a rear wheel 36 operably mounted to the back end 34 of the scooter deck 30. The rear wheel 36 is generally similar to prior art wheel constructions, and is therefore not described in greater detail herein.

Figure 5:
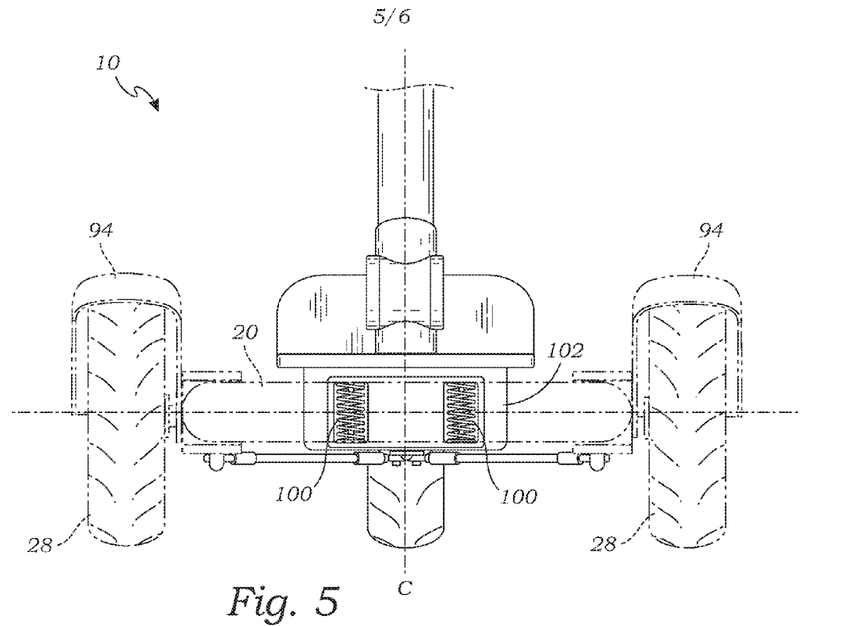
FIG. 5 is a front elevational view of the scooter of FIG. 1, with front components of the scooter shown in phantom to illustrate further components of the scooter.
Figure 6:
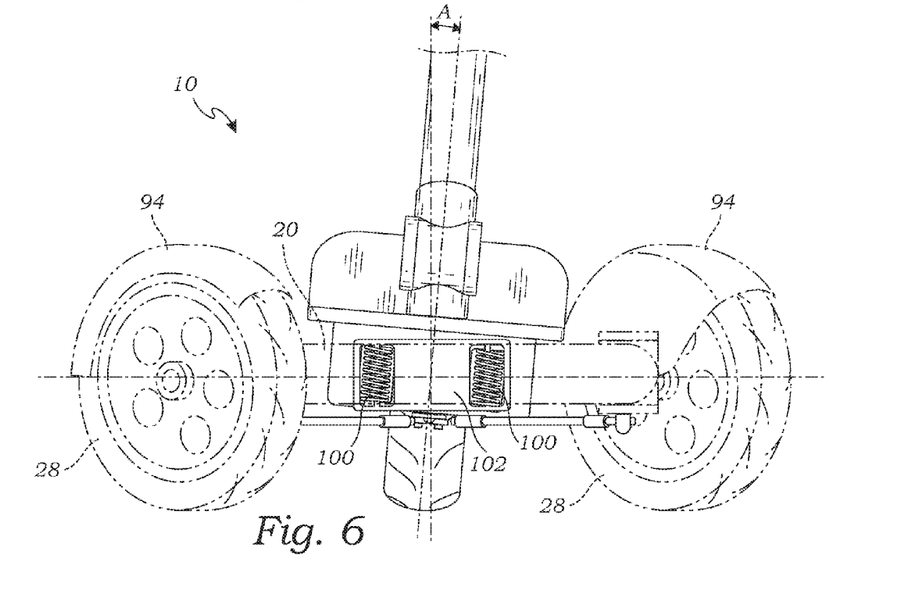
FIG. 6 is a front elevational view thereof when the scooter is in the leaning configuration of FIG. 2.

FIG. 5 is a front elevational view of the scooter 10 of FIG. 1, with front components of the scooter 10 shown in phantom to illustrate further components of the scooter 10. FIG. 6 is a front elevational view thereof when the scooter 10 is in the leaning configuration of FIG. 2. As shown in FIGS. 5 and 6, at least one spring 100 is operably mounted between the front support frame 20 and the scooter deck 30 for biasing the scooter deck 30 towards the horizontal configuration. The at least one spring 100 enables the scooter deck 30 to move to one of the leaning configurations when turning, when the user exerts enough force on the scooter deck 30 (and/or the handlebar structure 50) to overcome the bias of the at least one spring 100.

In the embodiment of FIGS. 5 and 6, the at least one spring 100 includes a pair of coil springs 100 on opposite sides of a centerline C of the scooter deck 30. The coil springs 100 are mounted between a first mounting plate 102 that is fixedly attached to the scooter deck 30, and a second mounting plate 104 that is fixedly attached to the front support frame 20. The mounting plates 102 and 104 may be disposed on parallel planes that enable them to slide with respect to each other, with or against the bias of the springs 100.

Figure 7:
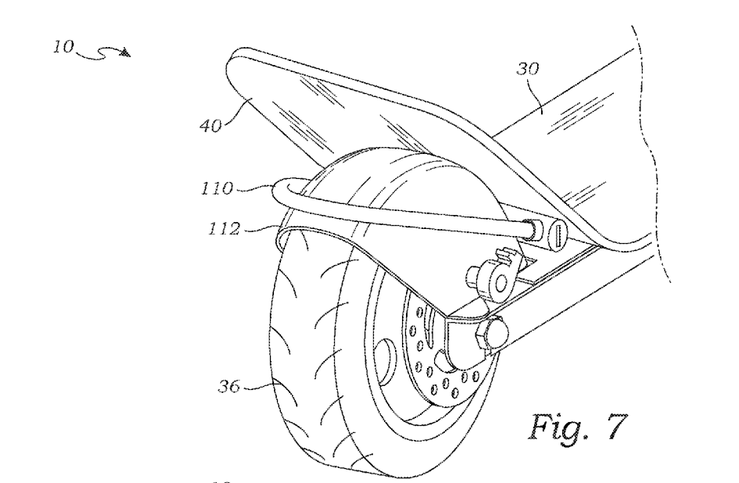
FIG. 7 is a rear perspective view of the scooter, illustrating a U-lock mounted on a rear fender of the scooter.
Figure 8:
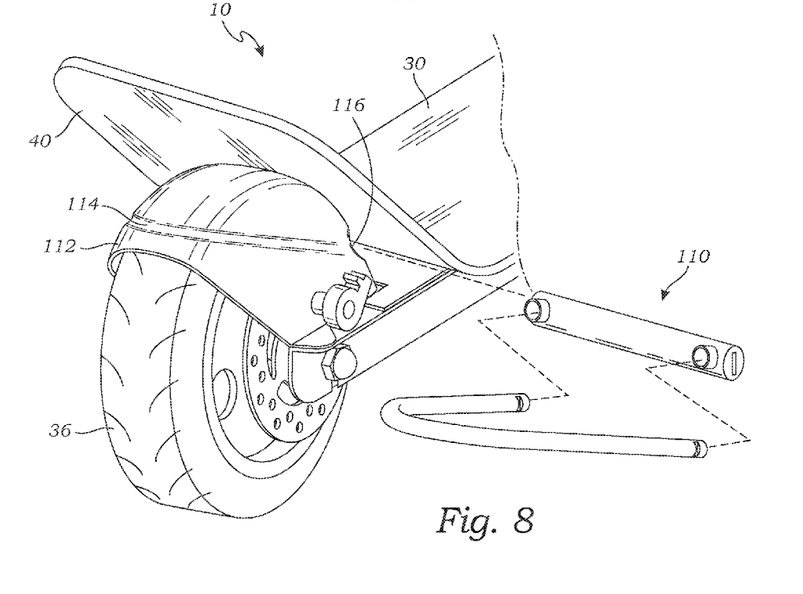
FIG. 8 is an exploded rear perspective view of the scooter of FIG. 7, illustrating the U-lock removed from the rear fender for use.

FIG. 7 is a rear perspective view of the scooter 10, illustrating a U-lock 110 mounted on a rear fender 112 of the scooter 10. FIG. 8 is an exploded rear perspective view of the scooter 10 of FIG. 7, illustrating the U-lock 110 removed from the rear fender 112 for use. As shown in FIGS. 7 and 8, the rear fender 112 may include a U-shaped depression 114 that extends at least partially around the rear fender 112, and may further include a linear depression 116 opposite the U-shaped depression 114, so that the U-lock 110 securely fits into the combination of the U-shaped depression 114 and the linear depression 116. The linear depression 116 is positioned under the scooter deck 30, in this embodiment beneath the upwardly canted rear portion 40 of the scooter deck 30.

As used in this application, the words "a," "an," and "one" are defined to include one or more of the referenced item unless specifically stated otherwise. The terms "approximately" and "about" are defined to mean+/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by the following claims.

What is claimed is:

1. A scooter comprising:
   a front support frame having a center body that extends lateral to ends;
   a pair of wheel pivots each mounted on one of the ends of the front support frame;
   a pair of front wheels, each operably mounted on one of the wheel pivots of the front support frame;
   a scooter deck having a front and a back end, the front end being pivotally mounted to the front support frame so that the scooter deck can pivot about an axis between a horizontal configuration and leaning configurations;
   a handlebar structure mounted on a steering post that extends upwardly from the front end of the scooter deck;
   at least one spring operably mounted between the front support frame and the scooter deck for biasing the scooter deck towards the horizontal configuration, but enabling the scooter deck to move to one of the leaning configurations when turning;
   a steering transmission arm having a proximal end, a middle portion, and a distal end;
   a first pivot pivotally attaching the proximal end of the steering transmission arm to the front support frame;
   a second pivot pivotally attaching the middle portion of the steering transmission arm to the scooter deck;
   a pair of steering rods, each having an inner end and an outer end, the inner end of each of the steering rods being pivotally connected to the distal end of the steering transmission arm, the outer end of each of the steering rods being operably connected to one of the front wheels, so that when the scooter deck is leaned to one of the leaning configurations, the movement causes the steering transmission arm to move about the second pivot, thereby turning the front wheels via the steering rods; and
   a rear wheel operably mounted to the back end of the scooter deck.

2. The scooter of claim 1, wherein the at least one spring includes a pair of coil springs on opposite sides of a centerline of the scooter deck.

3. The scooter of claim 1, wherein each of the front wheels includes a wheel housing that is attached to the front support frame with one of the wheel pivots.

4. The scooter of claim 3, wherein the wheel housing includes an axle for rotatably mounting the front wheel, a fender for covering a portion of the front wheel, and a pivot mounting body that extends laterally from the axle, and the wheel pivot extends through the pivot mounting body.

5. The scooter of claim 4, wherein the wheel pivot is positioned forward of the axle a distance.

6. The scooter of claim 5, wherein the pivot mounting body has a cam-shape.

7. The scooter of claim 5, wherein the outer end of the steering rod is attached to the pivot mounting body behind the wheel pivot.

8. The scooter of claim 7, wherein the outer end of the steering rod is attached to the pivot mounting body laterally across from or behind the axle of the front wheel.

9. The scooter of claim 1, wherein the steering transmission arm is an elongate structure that has an axis that is parallel with the axis of the scooter deck when the scooter deck is in the horizontal configuration.

10. A scooter comprising:
    a front support frame having a center body that extends lateral to ends;
    a pair of wheel pivots each mounted on one of the ends of the front support frame;
    a pair of front wheels, each operably mounted on one of the wheel pivots of the front support frame;
    a scooter deck having a front and a back end, the front end being pivotally mounted to the front support frame so that the scooter deck can pivot about an axis between a horizontal configuration and leaning configurations;
    a handlebar structure mounted on a steering post that extends upwardly from the front end of the scooter deck;
    at least one spring operably mounted between the front support frame and the scooter deck for biasing the scooter deck towards the horizontal configuration, but enabling the scooter deck to move to one of the leaning configurations when turning;

a steering transmission arm having a proximal end, a middle portion, and a distal end;

a first pivot pivotally attaching the proximal end of the steering transmission arm to the front support frame;

a second pivot pivotally attaching the middle portion of the steering transmission arm to the scooter deck;

a pair of steering rods, each having an inner end and an outer end, the inner end of each of the steering rods being pivotally connected to the distal end of the steering transmission arm, the outer end of each of the steering rods being operably connected to one of the front wheels, so that when the scooter deck is leaned to one of the leaning configurations, the movement causes the steering transmission arm to move about the second pivot, thereby turning the front wheels via the steering rods;

wherein each of the front wheels includes a wheel housing that is attached to the front support frame with one of the wheel pivots;

wherein the wheel housing includes an axle for rotatably mounting the front wheel, a fender for covering a portion of the front wheel, and a pivot mounting body that extends laterally from the axle, and the wheel pivot extends through the pivot mounting body;

wherein the wheel pivot is positioned forward of the axle a distance; and a rear wheel operably mounted to the back end of the scooter deck.

11. The scooter of claim 10, wherein the at least one spring includes a pair of coil springs on opposite sides of a centerline of the scooter deck.

12. The scooter of claim 10, wherein the outer end of the steering rod is attached to the pivot mounting body behind the wheel pivot.

13. The scooter of claim 12, wherein the outer end of the steering rod is attached to the pivot mounting body laterally across from or behind the axle of the front wheel.

14. The scooter of claim 10, wherein the steering transmission arm is an elongate structure that has an axis that is parallel with the axis of the scooter deck when the scooter deck is in the horizontal configuration.

* * * * *